US012602557B2

(12) United States Patent
Fox-Rabinovitz

(10) Patent No.: US 12,602,557 B2
(45) Date of Patent: *Apr. 14, 2026

(54) DECODING AND VALIDATION OF MACHINE-READABLE CODES VIA MULTIPLE SPECTRA OF LIGHT

(71) Applicant: Torc Robotics, Inc., Blacksburg, VA (US)

(72) Inventor: Joseph Fox-Rabinovitz, Blacksburg, VA (US)

(73) Assignee: Torc Robotics, Inc., Blacksburg, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/989,630

(22) Filed: Dec. 20, 2024

(65) Prior Publication Data

US 2025/0124242 A1     Apr. 17, 2025

Related U.S. Application Data

(63) Continuation of application No. 18/193,931, filed on Mar. 31, 2023, now Pat. No. 12,217,121.

(51) Int. Cl.
*G06K 7/10* (2006.01)
*G06K 19/06* (2006.01)

(52) U.S. Cl.
CPC ... *G06K 7/10544* (2013.01); *G06K 19/06037* (2013.01)

(58) Field of Classification Search
CPC ........ G06K 7/10544; G06K 7/00; G06K 7/14; G06K 19/06037; G06K 19/0614; G06K 19/06187; G06K 19/08
USPC ................................. 235/454, 439, 435, 375
See application file for complete search history.

(56) References Cited

U.S. PATENT DOCUMENTS

| | | | |
|---|---|---|---|
| 11,022,889 B2 | 6/2021 | Lee et al. | |
| 2003/0201059 A1 | 10/2003 | Holman et al. | |
| 2006/0018665 A1* | 1/2006 | Shibata ................. | H04J 14/025 |
| | | | 398/173 |
| 2014/0332150 A1 | 11/2014 | Hirakata et al. | |
| 2015/0334789 A1* | 11/2015 | van de Ven ............ | H05B 33/12 |
| | | | 313/498 |
| 2016/0025564 A1* | 1/2016 | Zhang ................... | G01J 3/2803 |
| | | | 356/326 |

(Continued)

FOREIGN PATENT DOCUMENTS

WO        2021158610 A1      8/2021

OTHER PUBLICATIONS

"The Correct Material for Infrared (IR) Applications", Retrieved from Internet: https://www.edmundoptics.com/knowledge-center/application-notes/optics/the-correct-material-for-infrared-applications/.

*Primary Examiner* — Edwyn Labaze
(74) *Attorney, Agent, or Firm* — Armstrong Teasdale LLP

(57)        ABSTRACT

Aspects of this technical solution can include a first layer having a first region and a second region, the first region and the second region having a first transmissivity property corresponding to a first portion of a spectrum of light and a second portion of the spectrum of light, having the first transmissivity property, and a second layer disposed over the first layer and having a third region and a fourth region, the third region and the fourth region having a second transmissivity property corresponding to the first portion of the spectrum of light and the second portion of the spectrum of light.

20 Claims, 8 Drawing Sheets

(56) References Cited

U.S. PATENT DOCUMENTS

| | | |
|---|---|---|
| 2016/0148089 A1 | 5/2016 | Boday et al. |
| 2018/0267217 A1 | 9/2018 | Yoshida et al. |

\* cited by examiner

300

400

<u>800</u>

Detect Third Region And Fourth Region Of Object    <u>810</u>

Detect By Sensor Configured To Detect Second
Portion Of Spectrum Of Light    <u>812</u>

Detect Third Region And Fourth Region Having
Second Transmissivity Property    <u>814</u>

Decode Second Encoding Defined By Third Region
And Fourth Region    <u>820</u>

Decode Second Encoding Corresponding To Machine-Readable Code <u>822</u>

Decode Code Visible In Second Portion Of Spectrum Of Light    <u>824</u>

Decode Code Invisible In First Portion Of Spectrum Of Light    <u>826</u>

Decode By Processor    <u>828</u>

Fig. 8

DECODING AND VALIDATION OF MACHINE-READABLE CODES VIA MULTIPLE SPECTRA OF LIGHT

CROSS-REFERENCE TO RELATED APPLICATIONS

This application is a Continuation of U.S. patent application Ser. No. 18/193,931 filed Mar. 31, 2023, the entire contents of which are hereby incorporated herein by reference.

TECHNICAL FIELD

The present implementations relate generally to machine vision, including but not limited to decoding and validation of machine-readable codes via multiple spectra of light.

BACKGROUND

Information presented in a physical environment can be useful for navigating to or from particular locations. Because of this value, navigators can place a high degree of trust in indicators of position or place in space or through a landscape, for example. However, with the increased demand for digitization of navigation, malicious actors can find increasing opportunities to tamper with information in the physical environment. Thus, awareness of potential tampering of machine-readable information presented for navigation is highly desirable.

SUMMARY

This technical solution is directed at least to visual codes with increased resistance to tampering and degradation. The technical solution can include a plurality of visual codes imprinted with or into a plurality of materials each responsive to different spectra of light. Each material can reflect light from a different portion of an electromagnetic spectrum, which can be overlapping or non-overlapping. For example, this technical solution can be directed to multiple stacked layers each having a visual code integrated therein, to achieve a plurality of visual codes at varying depths of a surface in a plan view thereof. For example, this technical solution can include a first material with one or more component materials having differing brightness or color in a visible spectrum of light, and a second material underneath the first material with one or more distinct component materials having differing brightness or color in an infrared spectrum of light. The underlying material can have a pattern invisible in the visible spectrum of light, and can correspond to a verification code for a pattern for an overlying material visible in the visible spectrum of light. The underlying layer can provide verification of authenticity or verification of content of the pattern integrated with the overlying material. Thus, a technical solution for decoding and validation of machine-readable codes via multiple spectra of light is provided.

At least one aspect is directed to an apparatus. The apparatus can include a first layer having a first region and a second region, the first region and the second region having a first transmissivity property corresponding to a first portion of a spectrum of light and a second portion of the spectrum of light, having the first transmissivity property. The apparatus can include a second layer disposed over the first layer and having a third region and a fourth region, the third region and the fourth region having a second transmissivity property corresponding to the first portion of the spectrum of light and the second portion of the spectrum of light.

At least one aspect is directed to a method of detection of codes in a plurality of spectra of light. The method can include detecting, by a sensor configured to detect a first portion of the spectrum of light, a first region and a second region of an object, the first region and the second region having a first transmissivity property corresponding to the first portion of a spectrum of light and a second portion of the spectrum of light. The method can include decoding, by a processor, a first encoding defined by the first region and the second region, the first encoding corresponding to a first machine-readable code visible in the first portion of the spectrum of light and invisible in the second portion of the spectrum of light.

At least one aspect is directed to a non-transitory computer readable medium with one or more instructions stored thereon and executable by a processor. The processor can decode a first encoding defined by a first region and a second region of an object, the first encoding corresponding to a first machine-readable code visible in a first portion of a spectrum of light and invisible in the second portion of the spectrum of light. The processor can decode a second encoding defined by a third region and a fourth region of the object, the second encoding corresponding to a second machine-readable code visible in the second portion of the spectrum of light and invisible in the first portion of the spectrum of light.

BRIEF DESCRIPTION OF THE FIGURES

These and other aspects and features of the present implementations are depicted by way of example in the figures discussed herein. Present implementations can be directed to, but are not limited to, examples depicted in the figures discussed herein.

FIG. 8 depicts an example method of detection of codes in a plurality of spectra of light, in accordance with present implementations.

DETAILED DESCRIPTION

Figure 1:
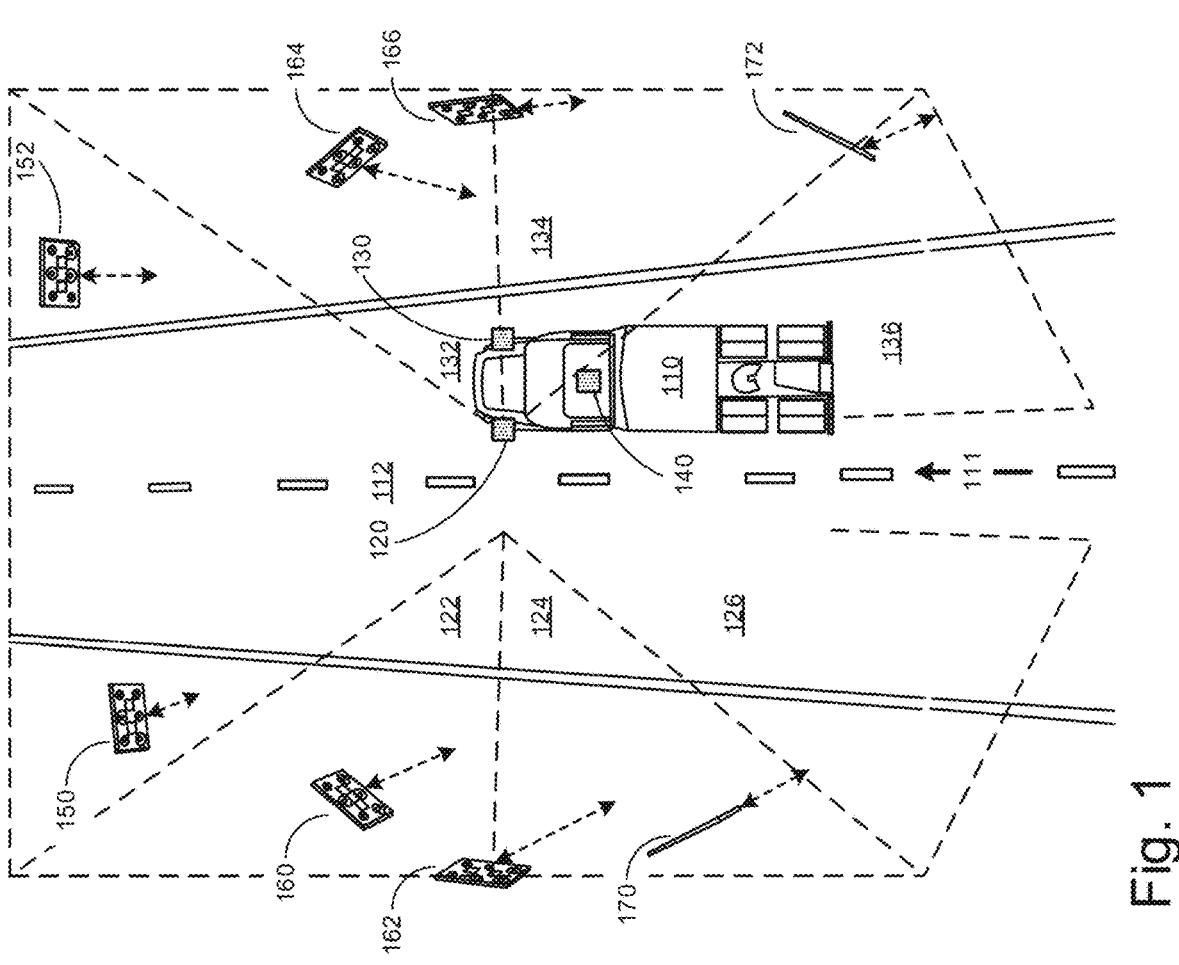
FIG. 1 depicts an example operating environment, in accordance with present implementations.

Aspects of this technical solution are described herein with reference to the figures, which are illustrative examples of this technical solution. The figures and examples below are not meant to limit the scope of this technical solution to the present implementations or to a single implementation, and other implementations in accordance with present implementations are possible, for example, by way of interchange of some or all of the described or illustrated elements. Where certain elements of the present implementations can be partially or fully implemented using known components, only those portions of such known components that are necessary for an understanding of the present implementations are described, and detailed descriptions of other portions of such known components are omitted to not obscure the present implementations. Terms in the specification and claims are to be ascribed no uncommon or special meaning unless explicitly set forth herein. Further, this technical solution and the present implementations encompass present and future known equivalents to the known components referred to herein by way of description, illustration, or example.

For example, targets can include placement of markers including tamper-resistant codes in a battle space. For example, a battle space can correspond to a terrestrial battlefield or any maritime, aerial, or space theater or volume. For example, advance units can mark key locations, buildings, landmarks, or any combination thereof, in a town that troops through which troops may later pass, for future reference. There are lots of reasons to mark, and most places will have no guarantee of security for the markers, so tamper resistance will be of utmost importance.

The technical solution can also provide a technical improvement of location determination with increased redundancy and increased failure resistance. For example, this technical solution can include a validation code hidden from unaided visual inspection, to provide secure verification of an informational code detectable by visual inspection. For example, the informational code can be constructed from material reflective in a visual spectrum of light, and can be transmissive to an infrared spectrum of light. The validation code can be disposed beneath the informational code, and can be constructed from material reflective an infrared spectrum of light. Thus, by visual inspection, only the informational code can be viewed. Modification of the visual code can block transmissivity of infrared light to the validation code, and thus indicate that the informational code cannot be validated. Modification of the visual code can modify a verification code derived based on information encoded in the informational code, and thus indicate that the informational code is invalid because it fails verification. Thus, this technical solution can achieve at least the technical improvement of providing informational codes that can be verified based on hidden codes resistant to tampering by physical encapsulation and resistant to inspection by being visible in spectra of light excluding visible light.

This technical solution can thus provide a technical improvement of at least high-reliability geolocation and data delivery in a range of physical environments that cannot be supported by conventional systems. For example, this technical solution can provide the technical improvement of effecting determination of location in physical environment where GPS or Internet are not available. Environments in which GPS or Internet are not available can include, for example, tunnels, urban canyons, and under bridges. This technical solution can be integrated with and be used in conjunction with existing landmarks, including, for example, road signs and roadway markers.

This technical solution is directed at least to detecting tampering of metadata included in one or more targets in a physical environment. Metadata can include, for example, precise geolocation data. Thus, technical improvement including elimination of gaps in available information, ease of maintenance, and independence of external authority or control, or communication are achieved by this technical solution. For example, this technical solution is directed at least to include a plurality of visual codes that can be printed or presented at various physical media, and placed at one or more predetermined routes or predetermined locations. For example, a visual code can include a QR code, a barcode or the like, but is not limited thereto. The visual code can store information to enable more precise navigation. For example, the visual code can include a precise location. A precise location can include one or more of a latitude, a longitude, and an elevation. For example, the visual code can include a date of installation or verification of the visual code. For example, the visual code can include an anti-tampering verification. For example, a second visual code can be disposed at least partially underneath the first visual code, and can include a machine-readable code corresponding to the overlying code. For example, the second visual code can correspond to a checksum of the overlying visual code, and can be insulated from the ambient environment by a material including the overlying visual code. Thus, the underlying visual code can resist modification due to encapsulation by an intervening material, and can indicate degradation or adversarial modification of an overlying visual code by providing a validation code corresponding to information carried by the overlying visual code.

A visual code can be placed or installed at any location detectable by a sensor of a vehicle during transit of the vehicle through the physical environment. For example, a plurality of visual codes can be embedded into, affixed to, or integrated with, one or more of a road sign, a survey marker, a guard rail, a fence, a building, a tree, any improvement to real estate, any natural feature in a physical environment, and a surface installed especially to house the visual indicator.

This technical solution can be integrated with predetermined paths through physical environments, including but not limited to fixed trucking routes. This technical solution can provide high precision information and guidance via road signs, for general purpose autonomous vehicles. This technical solution can achieve at least the technical improvement of a low-cost infrastructure for location and orientation awareness with no requirements for wide-area networks or remote communication. This technical solution can achieve at least the technical improvement of a low-cost infrastructure for location and orientation awareness by integration with road and traffic signs.

FIG. 1 depicts an example operating environment, in accordance with present implementations. As illustrated by way of example in FIG. 1, an example operating environment 100 can include at least a an automated truck 110, lateral targets 160, 162, 164 and 166, and rearward targets 170 and 172.

The automated truck 110 can correspond to a motor vehicle that can operate in at least a partially autonomous mode. A partially autonomous mode can include operation of at least a component of the vehicle independently of driver control. The automated trucks can correspond to a motor vehicle powered by a combustion engine, an electric battery, or any combination thereof, for example. The automated truck 110 is described as a truck by way of example, but is not limited to a truck, and can correspond to a motor vehicle having any structure or classification for movement across land, sea, air, or space. The automated truck 110 can include a direction of movement 111, a forward sensor field of view 112, a leftward environment sensor 120, and a rightward environment sensor 130. However, this technical solution is not limited to implementations including a vehicle or vehicle including any autonomous capability. For example, this technical solution can include any sensor device, system, or method configured to or capable of detecting codes having the structure discussed herein.

The leftward environment sensor 120 can capture one or more images in one or more spectra of light by one or more cameras configured to capture those spectra and oriented to one or more corresponding fields of view. For example, the leftward environment sensor 120 can include a first camera configured to capture images or video in a spectrum of light corresponding to visible light, and a second camera configured to capture images or video in a spectrum of light corresponding to infrared light or ultraviolet light. The leftward environment sensor 120 can include one or more cameras configured to capture any spectrum of electromagnetic radiation and is not limited to the spectra or combination of spectra discussed herein by way of example.

Figure 2:
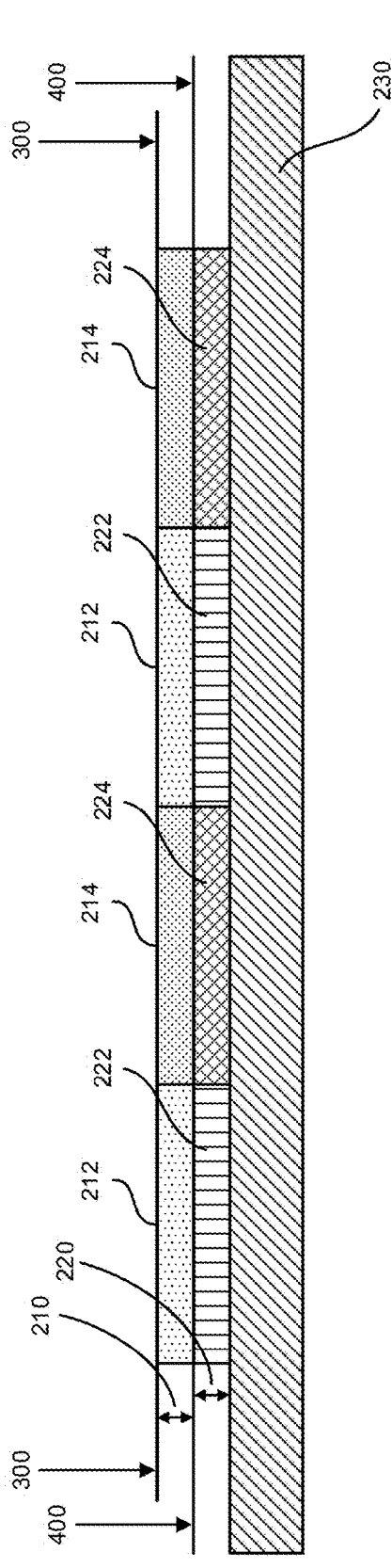
FIG. 2 depicts an example target panel, in accordance with present implementations.

FIG. 2 depicts an example target panel, in accordance with present implementations. As illustrated by way of example in FIG. 2, an example target panel 200 can include at least a visible light layer 210, an infrared light layer 220, and a panel substrate layer 230. The target panel can correspond at least partially in one or more of structure and operation to one or more of the lateral targets 160, 162, 164 and 166, the rearward targets 170 and 172, forward calibration targets 210 and 212, and the rearward calibration targets 220, 222, 224 and 226.

The visible light layer 210 can include a planar structure including one or more materials at least partially reflective with respect to a visible portion of an electromagnetic spectrum, and at least partially transmissive with respect to a portion of an electromagnetic spectrum at least partially excluding the visible portion of the electromagnetic spectrum. Thus, characteristics of the visible light layer 210 can be detectable via visible light, and can be invisible in spectra excluding visible light. For example, the visible light layer 210 can be formed with a visual pattern based on one or more materials having differing material properties with respect to reflectivity in the visible portion of the electromagnetic spectrum, and same or similar properties with respect to a portion of an electromagnetic spectrum at least partially excluding the visible portion of the electromagnetic spectrum. Differing material properties can correspond to properties that allow reflection of different subportions of the electromagnetic spectrum within the portion of the electromagnetic spectrum. For example, differing material properties can correspond to reflection of different colors of visible light. Differing material properties can correspond to properties that allow reflection of different amounts of the electromagnetic spectrum within the portion of the electromagnetic spectrum. For example, differing material properties within the visible light layer 210 can correspond to reflection of different luminosities of visible light.

The visible light layer 210 can include, but is not limited to, a machine-readable code having one or more different colors, brightness levels, or any combination thereof, in a particular portion of the electromagnetic spectrum. For example, the visible light layer 210 can include a QR code, barcode, or any machine-readable code with one or more geometric patterns or features. For example, the QR code can include one or more white portions, black portions, light portions, dark portions, in one or more colors of visible light. The visible light layer 210 can include any color or combination of colors, and is not limited to black-and-white or monochrome examples as discussed herein. The visible light layer 210 can include a light pattern region 212, and a dark pattern region 214.

The light pattern region 212 can be reflective with respect to a first subportion of light to a degree greater than the dark pattern region 214. For example, the light pattern region 212 can have a reflectivity corresponding to a white color or brightness in the visible portion of the electromagnetic spectrum. The light pattern region 212 can include a material having a reflectivity corresponding to a white color in the visible spectrum and can allow transmission of a portion of the electromagnetic spectrum at least partially excluding the visible portion of the electromagnetic spectrum. For example, the light pattern region 212 can include silicon or germanium. For example, a silicon or germanium material can include various doping of the other to change color along a spectrum and maintaining transmissivity in a particular portion of the electromagnetic spectrum. For example, germanium can be used a s first color, and silicon can be used as a second color, in the visible light layer. The light pattern region 212 can form a light portion of a machine-readable code detectable by visible light, including a white portion of a QR code pattern.

The dark pattern region 214 can be reflective with respect to a first subportion of light to a degree less than the light pattern region 212. For example, the light pattern region 212 can have a reflectivity corresponding to a black color or brightness in the visible portion of the electromagnetic spectrum. The dark pattern region 214 can include a material having a reflectivity corresponding to a black color in the visible spectrum and can allow transmission of a portion of the electromagnetic spectrum at least partially excluding the visible portion of the electromagnetic spectrum. For example, the dark pattern region 214 can include UV-fused silica, calcium fluoride, magnesium fluoride, potassium bromide, sapphire, silicon, sodium chloride, zinc selenide, zinc sulfide, or any combination thereof. The dark pattern region 214 can form a dark portion of a machine-readable code detectable by visible light, including a black portion of a QR code pattern.

The infrared light layer 220 can include a planar structure including one or more materials at least partially reflective with respect to an infrared portion of an electromagnetic spectrum. The infrared light layer 220 can optionally be at least partially transmissive with respect to a portion of an electromagnetic spectrum at least partially excluding the visible portion of the electromagnetic spectrum. Thus, characteristics of the infrared light layer 220 can be detectable via infrared light, and can be invisible in spectra excluding infrared light. For example, the infrared light layer 220 can be formed with a visual pattern based on one or more materials having differing material properties with respect to reflectivity in the infrared portion of the electromagnetic spectrum. The infrared light layer 220 can have same or similar properties with respect to a portion of an electromagnetic spectrum at least partially excluding the infrared portion of the electromagnetic spectrum. For example, differing material properties within the infrared light layer 220 can correspond to reflection of different luminosities of infrared light.

The infrared light layer 220 can include, but is not limited to, a machine-readable code having one or more different colors, brightness levels, or any combination thereof, in a particular portion of the electromagnetic spectrum, and can be distinct from the machine-readable code of the visible light layer 210 For example, the infrared reflecting layer 220 can include a QR code, barcode, or any machine-readable code with one or more geometric patterns or features. For example, the QR code can include one or more white portions, black portions, light portions, dark portions, in one or more colors of infrared light. The infrared reflecting layer 220 can include any color or combination of colors, and is not limited to black-and-white or monochrome examples as discussed herein. The machine-readable code of the infrared reflecting layer 220 can be disposed at least partially beneath the visible light layer 210 either directly or with one or more intervening layers. For example, the machine-readable code of the infrared reflecting layer 220 can correspond to a hidden QR code disposed beneath the QR code of the visible light layer 210. The infrared reflecting layer 220 can include a light infrared reflecting pattern region 222, and a dark infrared pattern region 224.

The light infrared reflecting pattern region 222 can be reflective with respect to a first subportion of light to a degree greater than the dark infrared pattern region 224. For example, the light pattern region 212 can have a reflectivity corresponding to a white color or brightness in the infrared portion of the electromagnetic spectrum. The light infrared reflecting pattern region 222 can include a material having a reflectivity corresponding to a white color in the infrared spectrum. The light infrared reflecting pattern region 222 can allow transmission of a portion of the electromagnetic spectrum at least partially excluding the visible portion of the electromagnetic spectrum. For example, the light infrared reflecting pattern region 222 can include one or more of N-BK-7, UV-fusermanium, or any combination thereof. The light infrared reflecting pattern region 222 can form a light portion of a machine-readable code detectable by infrared light, including a white portion of a QR code pattern.

The dark infrared pattern region 224 can be reflective with respect to a first subportion of light to a degree less than the light infrared reflecting pattern region 222. For example, the light infrared reflecting pattern region 222 can have a reflectivity corresponding to a black color or brightness in the infrared portion of the electromagnetic spectrum. The dark infrared pattern region 224 can include a material having a reflectivity corresponding to a black color in the infrared spectrum. The dark infrared pattern region 224 can allow transmission of a portion of the electromagnetic spectrum at least partially excluding the visible portion of the electromagnetic spectrum. For example, the dark infrared pattern region 224 can include silicon. The dark infrared pattern region 224 can form a dark portion of a machine-readable code detectable by infrared light, including a black portion of a QR code pattern.

The panel substrate layer 230 can support one or more of the visible light layer 210 and the infrared reflecting layer 220, and can include one or more component layers. The panel substrate layer 230 can correspond to one or more of a road sign, a survey marker, a guard rail, a fence, a building, a tree, any improvement to real estate, any natural feature in a physical environment, and a surface installed especially to house the visual indicator. For example, the panel substrate layer 330 can include a portion of a road sign installed over a roadway, but is not limited thereto.

Figure 3:
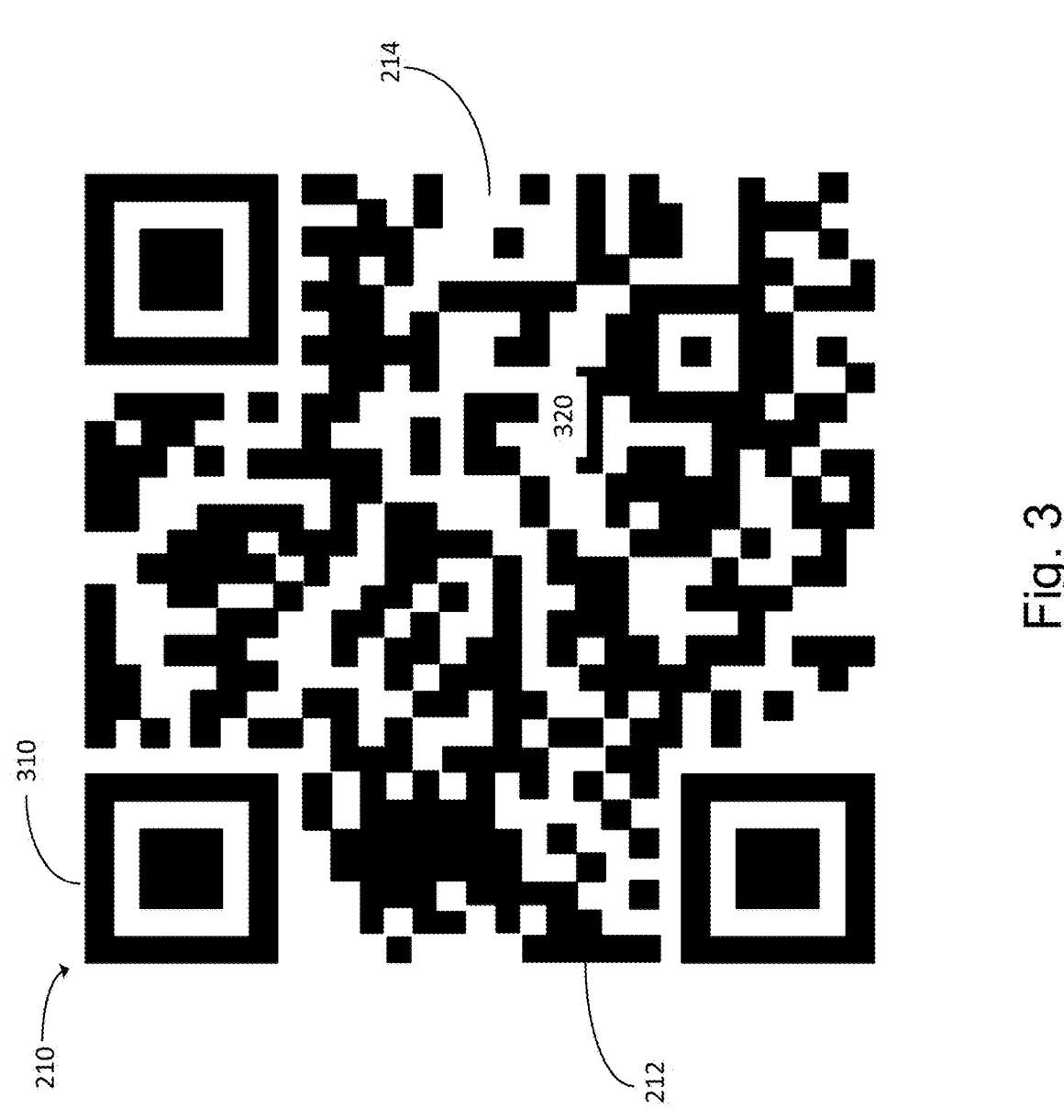
FIG. 3 depicts an example visible pattern, in accordance with present implementations.

FIG. 3 depicts an example visible pattern, in accordance with present implementations. As illustrated by way of example in FIG. 3, an example visible pattern 300 can include at least an alignment pattern 310 and a payload pattern 320. The visible pattern 300 can correspond at least partially in one or more of structure and operation to the light pattern region 212. For example, the visible pattern 300 can correspond to the visible light layer 310 in a plan view. For example, the visible pattern 300 can be visible in a first portion of an electromagnetic spectrum, but not a second portion of an electromagnetic spectrum.

The alignment pattern 310 can include one or more geometric features to identify an orientation of the visible pattern 300 along one or more axes, along one or more angles of rotation around one or more axes, or any combination thereof. For example, the alignment pattern 310 can correspond to one or more rectangular or square regions in a plan view corresponding to a portion of a QR code visible in a portion of the electromagnetic spectrum corresponding to visible light. The alignment pattern 310 can be invisible in a portion of the electromagnetic spectrum corresponding to infrared light.

The payload pattern 320 can include one or more geometric features encoded with one or more parameters corresponding to one or more of the lateral targets 160, 162, 164 and 166, the rearward targets 170 and 172, forward calibration targets 210 and 212, and the rearward calibration targets 220, 222, 224 and 226. For example, the payload pattern 320 can encode a location including one or more of a latitude, longitude, and elevation. For example, the payload pattern 320 can encode metadata including a datestamp or timestamp corresponding to encoding of the payload pattern 320, an identifier of the payload pattern, or any combination thereof. Thus, the payload pattern 320 can store data corresponding to locating the automated truck 110 or orienting the automated truck 110 in a physical environment.

Figure 4:
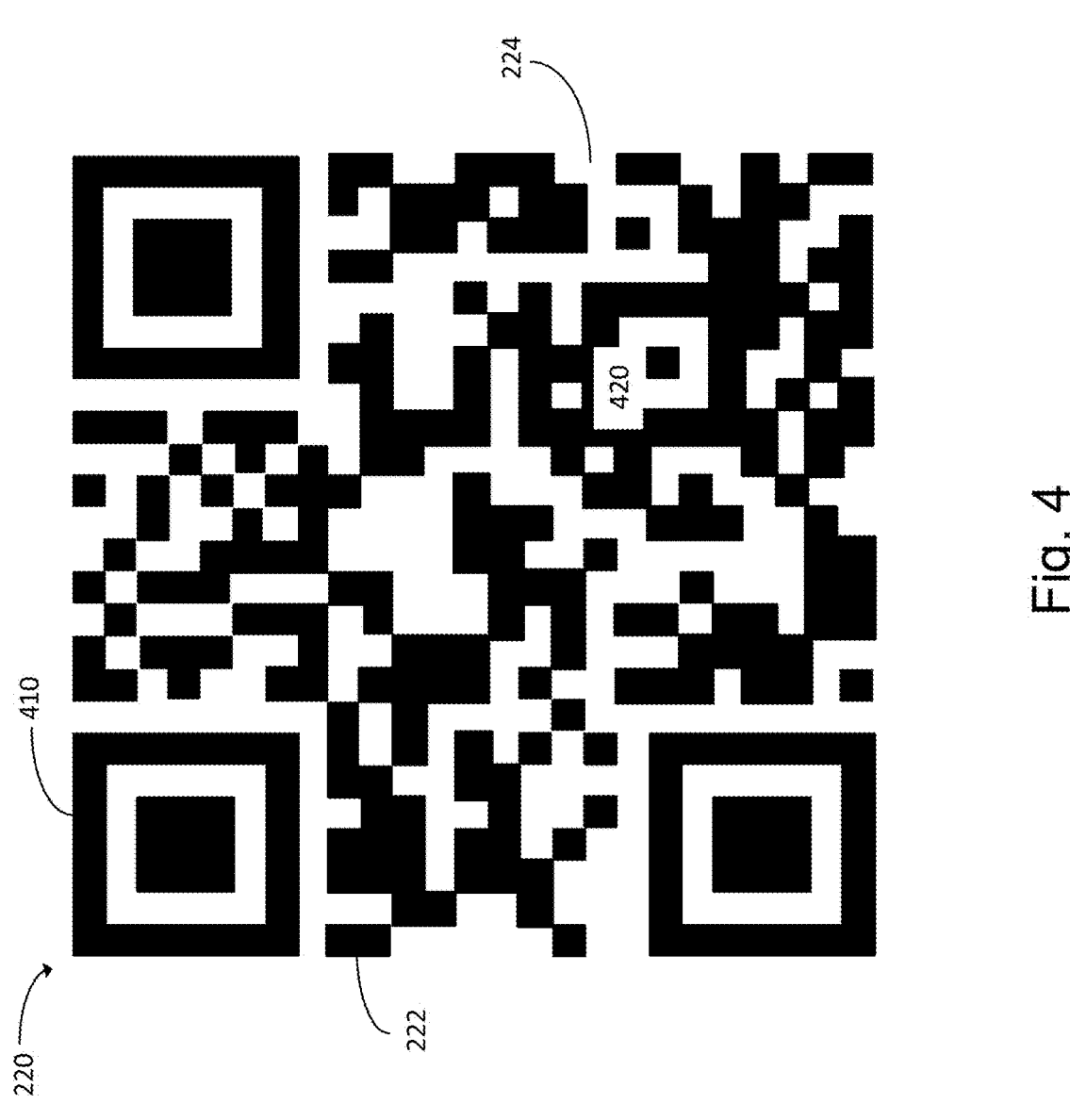
FIG. 4 depicts an example hidden pattern, in accordance with present implementations.

FIG. 4 depicts an example hidden pattern, in accordance with present implementations. As illustrated by way of example in FIG. 4, an example hidden pattern 400 can include at least an alignment pattern 410 and a payload pattern 420. The visible light layer pattern 300 can correspond at least partially in one or more of structure and operation to the light pattern region 212. For example, the hidden pattern 400 can correspond to the infrared reflecting layer 220 in a plan view.

The alignment pattern 410 can include one or more geometric features to identify an orientation of the hidden pattern 400 along one or more axes, along one or more angles of rotation around one or more axes, or any combination thereof. For example, the alignment pattern 410 can correspond to one or more rectangular or square regions in a plan view corresponding to a portion of a QR code visible in a portion of the electromagnetic spectrum corresponding to infrared light. The alignment pattern 410 can be invisible in a portion of the electromagnetic spectrum corresponding to visible light. The alignment pattern 410 can provide a technical improvement of providing alignment for the payload pattern 420 independently of the alignment pattern 310 and by eliminating interference from the alignment pattern 310 and the payload pattern 320 when located above the alignment pattern 410.

The payload pattern 420 can include one or more geometric features encoded with one or more parameters corresponding payload pattern 320. For example, the payload pattern 520 can encode a checksum or hash derived from at least a portion of the payload pattern 320. For example, the payload pattern 420 can correspond to one or more of a latitude, longitude, and elevation. For example, the payload pattern 420 can correspond to metadata including a datestamp or timestamp corresponding to encoding of the payload pattern 320, an identifier of the payload pattern, or any combination thereof. Thus, the payload pattern 420 can provide a technical solution to store data to verify one or more of authenticity and accuracy of data of the payload pattern 320. This technical solution can thus include a technical improvement of at least verifying one or more of authenticity and accuracy of data to locate the automated truck 110 or orient the automated truck 110 in a physical environment.

For example, one or more sensors or processors as discussed herein can validate a code based on patterns corresponding to one or more layers as discussed herein. For example, the payload pattern 320 can be obtained to indicate particular information, and the payload pattern 420 can be obtained to indicate information about the payload pattern 320. The system can obtain both payload patterns, can perform error checking of the payload pattern 320 based on information contained in the payload pattern 420. For example, the system can correlate the payload pattern 320 and the payload pattern 420 based on distinct information carried in each. For example, the payload pattern 420 can include or correspond to a hash or other code corresponding information in the payload pattern 320 in the absence of tampering. Thus, the system can determine presence of tampering by determining, for example, a discrepancy between a hash of information derived from payload pattern 320 or a pattern overlaid on the payload pattern 320 to replace or supplant the payload pattern 320, and the payload pattern 420. In response, the information in the visible code of payload pattern 320 can be corroborated or discarded as necessary based on validation including the payload pattern 420.

Figure 5:
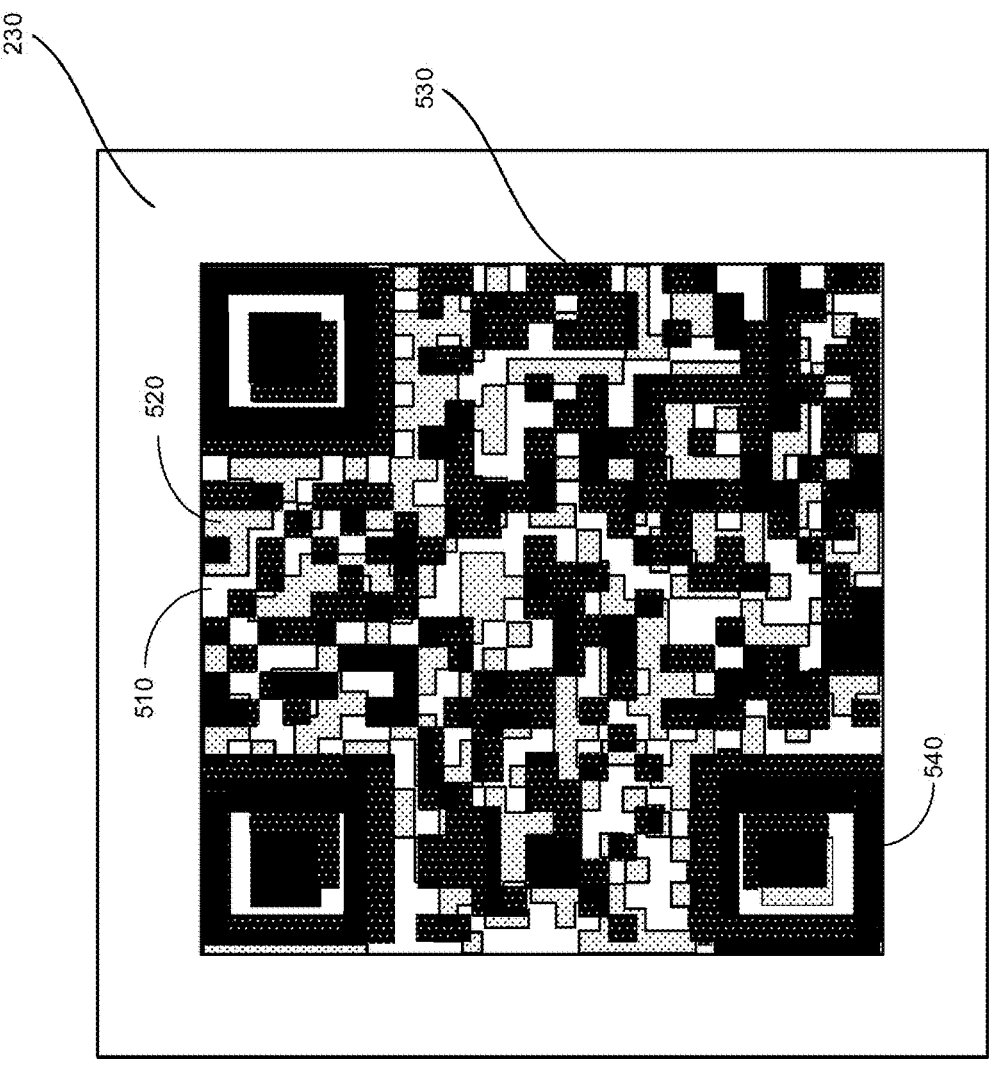
FIG. 5 depicts an example target panel brightness distribution, in accordance with present implementations.

FIG. 5 depicts an example target panel, in accordance with present implementations. As illustrated by way of example in FIG. 5, an example target panel 500 can include at least an alignment pattern 502, a payload pattern 504, a first overlay pattern area 510, a second overlay pattern area 520, a third overlay pattern area 530, and a fourth overlay pattern area 540. The target panel brightness distribution 600 can correspond to a layout of the visible pattern 300 and the hidden pattern 400.

The alignment pattern 502 can correspond at least partially in one or more of structure and operation to the alignment pattern 310 and the alignment pattern 410. As illustrated by way of example, the alignment pattern 310 and the alignment pattern 410 can each have square or rectangular patterns of sizes and shapes distinct from one another. Thus, the alignment pattern 502 can provide a technical solution of high-density alignment information by the technical improvement of overlaid visual patterns variously detectable in differing portions of the electromagnetic spectrum. The payload pattern 504 can correspond at least partially in one or more of structure and operation to the payload pattern 320 and the payload pattern 420. As illustrated by way of example, the payload pattern 320 and the payload pattern 420 can each have patterns of sizes and shapes distinct from one another. Thus, the payload pattern 504 can provide a technical solution of a verifiable QR code by the technical improvement of overlaid visual patterns variously detectable in differing portions of the electromagnetic spectrum, and corresponding respectively to data and a verification code for the data.

The first overlay pattern area 510 can correspond to a portion of the target panel 560 having a light pattern region 212 disposed over a light infrared reflecting pattern region 222. The first overlay pattern area 510 can thus correspond to a light color or brightness portion of a visible pattern 300 over a light color or brightness portion of a hidden pattern 400, to provide at least the technical improvement of selective visibility and detectability of the light pattern region 212 disposed over a light infrared reflecting pattern region 222 without interference therebetween. The second overlay pattern area 520 can correspond to a portion of the target panel 560 having a light pattern region 212 disposed over a dark infrared pattern region 224. The second overlay pattern area 520 can thus correspond to a light color or brightness portion of a visible pattern 300 over a dark color or brightness portion of a hidden pattern 400, to provide at least the technical improvement of selective visibility and detectability of the light pattern region 212 disposed over a dark infrared pattern region 224 without interference therebetween.

The third overlay pattern area 530 can correspond to a portion of the target panel 660 having a dark pattern region 214 disposed over a light infrared reflecting pattern region 222. The third overlay pattern area 530 can thus correspond to a dark color or brightness portion of a visible pattern 300 over a light color or brightness portion of a hidden pattern 400, to provide at least the technical improvement of selective visibility and detectability of the dark pattern region 214 disposed over a light infrared reflecting pattern region 222 without interference therebetween. The fourth overlay pattern area 540 can correspond to a portion of the target panel 560 having a dark pattern region 214 disposed over a dark infrared pattern region 224. The fourth overlay pattern area 530 can thus correspond to a dark color or brightness portion of a visible pattern 300 over a dark color or brightness portion of a hidden pattern 400, to provide at least the technical improvement of selective visibility and detectability of the dark pattern region 214 disposed over a dark infrared pattern region 224 without interference therebetween.

Figure 6:
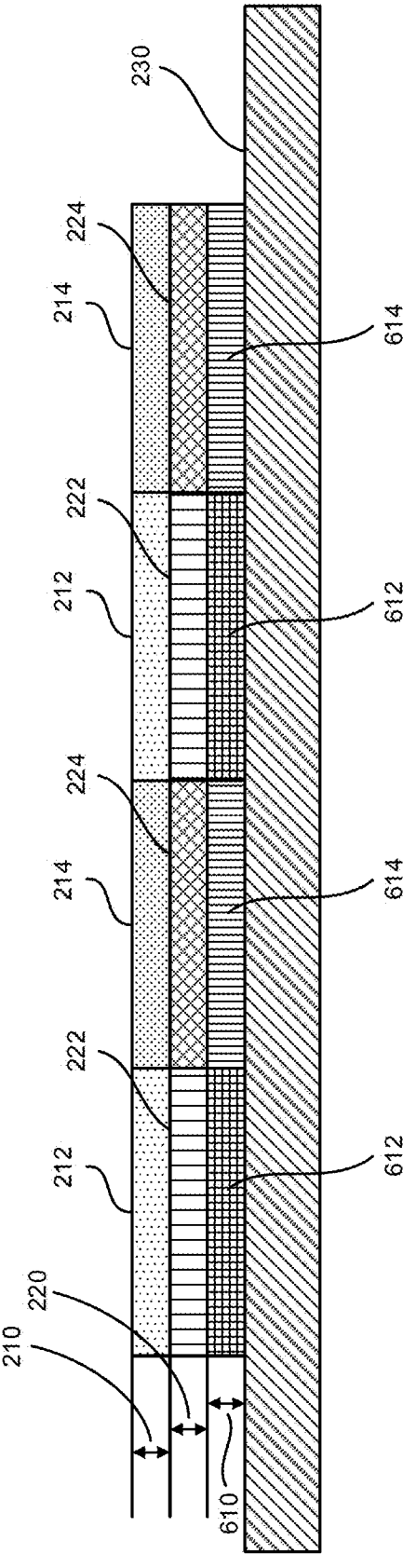
FIG. 6 depicts an example multilayer target panel, in accordance with present implementations.

FIG. 6 depicts an example multilayer target panel, in accordance with present implementations. As illustrated by way of example in FIG. 6, an example multilayer target panel 600 can include at least a spectrum layer 610. The multilayer target panel 600 can provide a technical solution of providing three overlaid machine-readable codes, where each code is visible in a distinct portion of the electromagnetic spectrum and one or more of the codes is integrated with respective layers having materials properties transmissive to one or more portions of the electromagnetic spectrum. This technical solution is not limited to panels having a number of layers illustrated herein by way of example, and can have any number of layers according to the examples discussed herein. For example, this technical solution can respectively include layers responsive respectively to visible, infrared, and ultraviolet portions of the electromagnetic spectrum.

This technical solution is not limited to the particular number of light and dark regions discussed herein by way of example. This technical solution can have any number of distinct pattern regions or pattern areas, and is not limited to the examples discussed herein. For example, a panel can include regions respectively responsive to two, three, four or more colors of a particular pattern. For example, a QR code or machine-readable code can be encoded with three distinct colors, or any one or more colors and any one or more brightness levels. For example, a QR code can be encoded with white, black, gray, light blue, dark blue, medium blue, light green, dark green, medium green, light red, dark red, medium red, or any combination thereof.

The spectrum layer 610 can include a planar structure including one or more materials at least partially reflective with respect to a portion of an electromagnetic spectrum distinct from that of layers 210 and 220. For example, the spectrum layer 610 can be partially reflective with respect to a portion of an electromagnetic spectrum corresponding to ultraviolet light. The spectrum layer 610 can optionally be at least partially transmissive with respect to a portion of an electromagnetic spectrum at least partially excluding the visible portion of the electromagnetic spectrum and the infrared portion of the electromagnetic spectrum respectively corresponding to the layer 210 and 220. Thus, characteristics of the spectrum layer 610 can be detectable via ultraviolet light, for example, and can be invisible in spectra excluding ultraviolet light. For example, the spectrum layer 610 can be formed with a visual pattern based on one or more materials having differing material properties with respect to reflectivity in the ultraviolet portion of the electromagnetic spectrum. The i spectrum layer 610 can have same or similar properties with respect to a portion of an electromagnetic spectrum at least partially excluding the ultraviolet portion of the electromagnetic spectrum. For example, differing material properties within the spectrum layer 610 can correspond to reflection of different luminosities of infrared light.

The spectrum layer 610 can include, but is not limited to, a machine-readable code having one or more different colors, brightness levels, or any combination thereof, in a particular portion of the electromagnetic spectrum, and can be distinct from the machine-readable codes of the visible light layer 210 and the infrared reflecting layer 220. For example, the spectrum layer 610 can include a QR code, barcode, or any machine-readable code with one or more geometric patterns or features. For example, the QR code can include one or more white portions, black portions, light portions, dark portions, in one or more colors of infrared light. The spectrum layer 610 can include any color or combination of colors, and is not limited to black-and-white or monochrome examples as discussed herein. The machine-readable code of the spectrum layer 610 can be disposed at least partially beneath the visible light layer 210 either directly or with one or more intervening layers. The machine-readable code of the spectrum layer 610 can be disposed at least partially beneath or over the infrared reflecting layer 220 either directly or with one or more intervening layers. For example, the machine-readable code of the infrared reflecting layer 220 can correspond to a second hidden QR code disposed beneath the QR code of the visible light layer 210 and a first hidden QR code of the infrared reflecting layer 220. The spectrum layer 610 can include a light pattern region 612, and a dark pattern region 614.

The light pattern region 612 can be reflective with respect to a first subportion of light to a degree greater than the dark pattern region 614. For example, the light pattern region 212 can have a reflectivity corresponding to a white color or brightness in the ultraviolet portion of the electromagnetic spectrum. The light pattern region 612 can include a material having a reflectivity corresponding to a white color in the ultraviolet spectrum. The light pattern region 612 can allow transmission of a portion of the electromagnetic spectrum at least partially excluding the visible portion of the electromagnetic spectrum and the infrared portion of the electromagnetic spectrum. For example, the light pattern region 612 can include one or more materials as discussed herein by way of example. The light pattern region 612 can form a light portion of a machine-readable code detectable by ultraviolet light, including a white portion of a QR code pattern.

The dark pattern region 614 can be reflective with respect to a first subportion of light to a degree less than the light pattern region 612. For example, the dark pattern region 614 can have a reflectivity corresponding to a black color or brightness in the infrared portion of the electromagnetic spectrum. The dark pattern region 614 can include a material having a reflectivity corresponding to a black color in the ultraviolet spectrum. The dark pattern region 614 can allow transmission of a portion of the electromagnetic spectrum at least partially excluding the visible portion of the electromagnetic spectrum and the infrared portion of the electromagnetic spectrum. For example, the dark pattern region 614 can include one or more of materials as discussed herein by way of example. The dark pattern region 614 can form a dark portion of a machine-readable code detectable by ultraviolet light, including a black portion of a QR code pattern.

For example, the apparatus can include the first layer corresponding to an encoding can include the first region and the second region, the encoding visible in the first portion of the spectrum of light and invisible in the second portion of the spectrum of light. For example, the apparatus can include the second layer corresponding to an encoding can include the third region and the fourth region, the encoding visible in the second portion of the spectrum of light and invisible in the first portion of the spectrum of light. For example, the apparatus can include the first portion of the spectrum of light corresponding to an infrared spectrum of light, and the second portion of light corresponding to a visible spectrum of light. For example, the apparatus can include the first transmissivity property corresponding to a first reflectivity in the first portion of the spectrum of light, and the second transmissivity property corresponding to a second reflectivity in the first portion of the spectrum of light lower than the first reflectivity. For example, the apparatus can include the first region having a first brightness property in the first portion of the spectrum of light, and the second region having a second brightness in the first portion of the spectrum of light greater than the first brightness property. For example, the apparatus can include the third region having a first brightness property in the second portion of the spectrum of light, and the fourth region having a second brightness in the second portion of the spectrum of light greater than the first brightness property. For example, the apparatus can include a third layer having a third transmissivity property corresponding to the first portion of a spectrum of light and the second portion of a spectrum of light.

Figure 7:
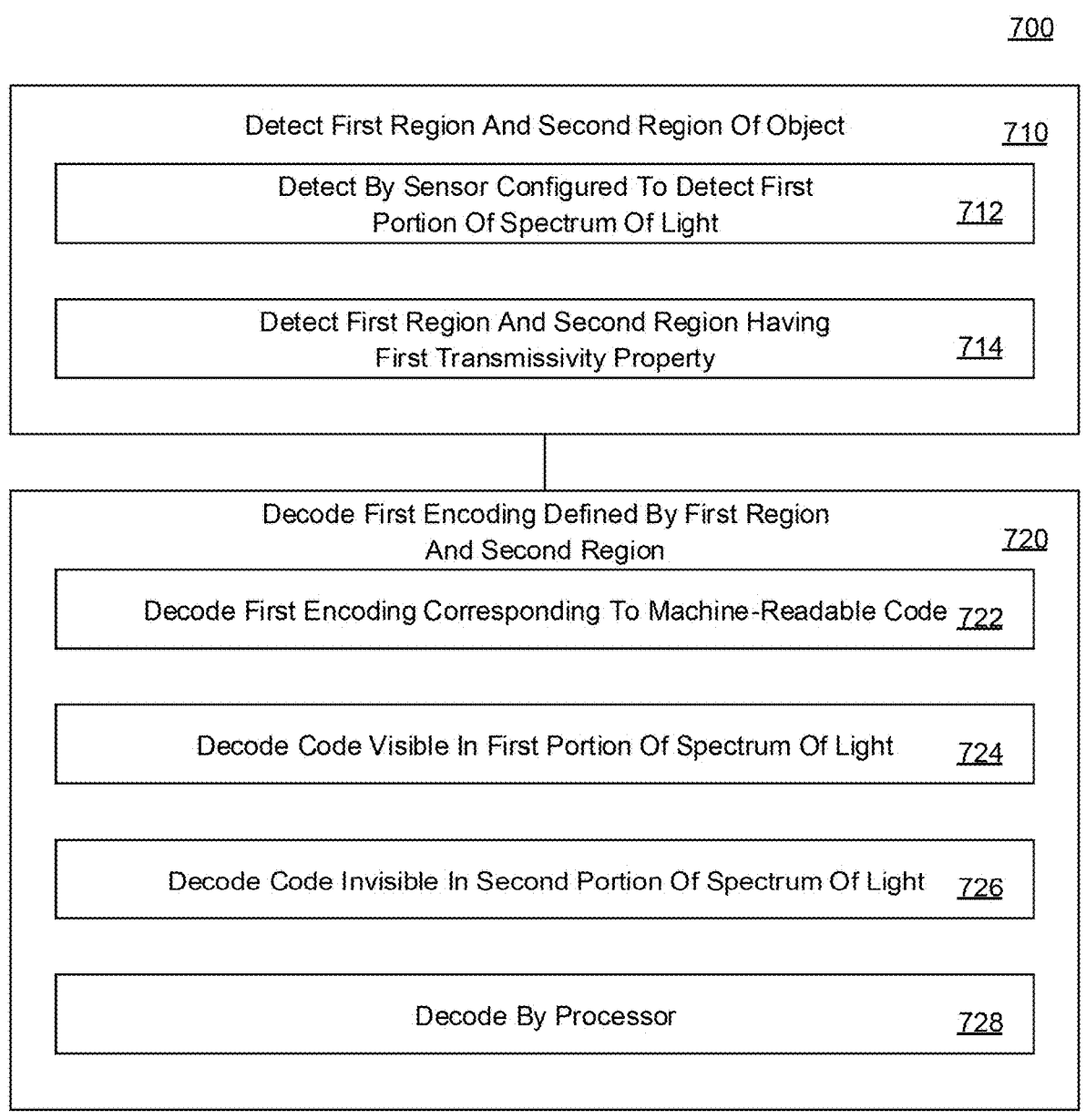
FIG. 7 depicts an example method of detection of codes in a plurality of spectra of light, in accordance with present implementations.

FIG. 7 depicts an example method of detection of codes in a plurality of spectra of light, in accordance with present implementations. At least the target panel 200, the target panel 600, or any component thereof, can perform method 700. At 710, the method 700 can detect a first region and a second region of an object. At 712, the method 700 can detect a first region and a second region of an object by a sensor configured to detect a first portion of the spectrum of light. At 714, the method 700 can detect the first region and the second region having a first transmissivity property. At 720, the method 700 can decode a first encoding defined by the first region and the second region. At 722, the method 700 can decode the first encoding corresponding to a machine-readable code. At 724, the method 700 can decode code visible in the first portion of the spectrum of light. At 726, the method 700 can decode code invisible in the second portion of the spectrum of light. At 728, the method 700 can decode a first encoding by a processor.

FIG. 8 depicts an example method of detection of codes in a plurality of spectra of light, in accordance with present implementations. At least the target panel 200, the target panel 600, or any component thereof, can perform method 800. At 810, the method 800 can detect a third region and a fourth region of an object. At 812, the method 800 can detect a third region and a fourth region of an object by a sensor configured to detect a second portion of the spectrum of light. At 814, the method 800 can detect the third region and the fourth region having a second transmissivity property. At 820, the method 800 can decode a second encoding defined by the third region and the fourth region. At 822, the method 800 can decode the second encoding corresponding to a machine-readable code. At 824, the method 800 can decode code visible in the second portion of the spectrum of light. At 826, the method 800 can decode code invisible in the first portion of the spectrum of light. At 828, the method 800 can decode a second encoding by a processor.

For example, the methods can include identifying, by the processor, the first encoding during movement of a vehicle can include the sensor through a physical environment. For example, the methods can include detecting, by the sensor configured to detect the second portion of the spectrum of light, a third region and a fourth region of the object, the third region and the fourth region having a second transmissivity property corresponding to the first portion of the spectrum of light and the second portion of the spectrum of light. The method can include decoding, by the processor, a second encoding defined by the third region and the fourth region, the second encoding corresponding to a second machine-readable code visible in the second portion of the spectrum of light and invisible in the first portion of the spectrum of light. For example, the methods can include identifying, by the processor, the second encoding during movement of a vehicle can include the sensor through a physical environment.

For example, in the methods, the first region and the second region can include a first layer of the object and having a planar structure. For example, in the methods, the third region and the fourth region can include a second layer of the object and having a planar structure, and the second layer disposed over the first layer. For example, in the methods, the first portion of the spectrum of light can correspond to an infrared spectrum of light, and the second portion of light corresponding to a visible spectrum of light. For example, in the methods, the first transmissivity property can correspond to a first reflectivity in the first portion of the spectrum of light, and the second transmissivity property corresponding to a second reflectivity in the first portion of the spectrum of light lower than the first reflectivity.

For example, in the methods, the first region can have a first brightness property in the first portion of the spectrum of light, and the second region having a second brightness in the first portion of the spectrum of light greater than the first brightness property. For example, in the methods, the third region can have a first brightness property in the second portion of the spectrum of light, and the fourth region having a second brightness in the second portion of the spectrum of light greater than the first brightness property.

For example, the computer readable medium can include one or more instructions executable by the processor to obtain, by a sensor configured to detect the first portion of the spectrum of light, the first encoding, the first region and the second region having a first transmissivity property corresponding to the first portion of a spectrum of light and a second portion of the spectrum of light. The processor can obtain, by the sensor configured to detect the second portion of the spectrum of light, the second encoding, the third region and the fourth region having a second transmissivity property corresponding to the first portion of the spectrum of light and the second portion of the spectrum of light.

Having now described some illustrative implementations, the foregoing is illustrative and not limiting, having been presented by way of example. In particular, although many of the examples presented herein involve specific combinations of method acts or system elements, those acts and those elements may be combined in other was to accomplish the same objectives. Acts, elements and features discussed in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both "A" and 'B'. Such references used in conjunction with "comprising" or other open terminology can include additional items. References to "is" or "are" may be construed as nonlimiting to the implementation or action referenced in connection with that term. The terms "is" or "are" or any tense or derivative thereof, are interchangeable and synonymous with "can be" as used herein, unless stated otherwise herein.

Directional indicators depicted herein are example directions to facilitate understanding of the examples discussed herein, and are not limited to the directional indicators depicted herein. Any directional indicator depicted herein can be modified to the reverse direction, or can be modified to include both the depicted direction and a direction reverse to the depicted direction, unless stated otherwise herein. While operations are depicted in the drawings in a particular order, such operations are not required to be performed in the particular order shown or in sequential order, and all illustrated operations are not required to be performed. Actions described herein can be performed in a different order. Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Scope of the systems and methods described herein is thus indicated by the appended claims, rather than the foregoing description. The scope of the claims includes equivalents to the meaning and scope of the appended claims.

What is claimed is:

1. An apparatus, comprising:
   a first region and a second region, the first region and the second region having a first transmissivity property corresponding to a first portion of a spectrum of light and a second portion of the spectrum of light; and
   a third region and a fourth region, the third region and the fourth region having a second transmissivity property corresponding to the first portion of the spectrum of light and the second portion of the spectrum of light.

2. The apparatus of claim 1, wherein the first region and the second region define a first alignment pattern and a first payload pattern, and the third region and the fourth region define a second alignment pattern and a second payload pattern.

3. The apparatus of claim 2, wherein the first payload pattern includes a first encoding of metadata related to the first payload pattern.

4. The apparatus of claim 3, wherein the second payload pattern includes a second encoding of the metadata related to the first payload pattern.

5. The apparatus of claim 4, wherein the second payload pattern includes an encoding of at least one of a checksum or hash associated with at least a portion of the first payload pattern.

6. The apparatus of claim 1, further comprising a first layer, wherein the first region and the second region are positioned in the first layer and define a first encoding, the first layer having a planar structure.

7. The apparatus of claim 6, further comprising a second layer, wherein the third region and the fourth region are positioned in the second layer and define a second encoding, and the second layer having the planar structure and disposed over the first layer.

8. The apparatus of claim 7, further comprising a substrate layer, the second layer disposed over the substrate layer.

9. The apparatus of claim 1, further comprising a third layer having a third transmissivity property corresponding to a third portion of the spectrum light distinct from the first portion of the spectrum of light and the second portion of the spectrum light.

10. The apparatus of claim 9, wherein the first portion of the spectrum of light corresponds to infrared light, the second portion of the spectrum of light corresponds to visible light, and the third portion of the spectrum of light corresponds to ultraviolet light.

11. A method of detection of codes in a plurality of spectra of light, the method comprising:

detecting, by a sensor of a vehicle configured to detect a first portion of a spectrum of light, a first region and a second region of an object, the first region and the second region having a first transmissivity property corresponding to the first portion of a spectrum of light and a second portion of the spectrum of light; and decoding, by a processor, a first encoding defined by the first region and the second region, the first encoding corresponding to a first machine-readable code visible in the first portion of the spectrum of light and invisible in the second portion of the spectrum of light.

12. The method of claim 11, further comprising:

identifying, by the processor, the first encoding, while the vehicle is in a physical environment including the object.

13. The method of claim 12, further comprising:

detecting, by the sensor configured to detect the second portion of the spectrum of light, a third region and a fourth region of the object, the third region and the fourth region having a second transmissivity property corresponding to the first portion of the spectrum of light and the second portion of the spectrum of light; and decoding, by the processor, a second encoding defined by the third region and the fourth region, the second encoding corresponding to a second machine-readable code visible in the second portion of the spectrum of light and invisible in the first portion of the spectrum of light.

14. The method of claim 13, further comprising:

identifying, by the processor, the second encoding, where the vehicle is in the physical environment.

15. The method of claim 13, further comprising:

authenticating, by the processor, the first encoding based on the second encoding.

16. The method of claim 15, wherein authenticating further comprises identifying a discrepancy between a hash of information based on the first encoding and the second encoding.

17. An apparatus, comprising:

a first layer having a first region and a second region, the first region and the second region having a first transmissivity property corresponding to a first portion of a spectrum of light and a second portion of the spectrum of light; and a second layer disposed over the first layer and having a third region and a fourth region, the third region and the fourth region having a second transmissivity property corresponding to the first portion of the spectrum of light and the second portion of the spectrum of light;

wherein the first layer defines a first encoding, and the second layer defines a second encoding, at least one of the first encoding or the second encoding including metadata associated with the first encoding.

18. The apparatus of claim 17, wherein the first region and the second region define a first alignment pattern and a first payload pattern, and the third region and the fourth region define a second alignment pattern and a second payload pattern.

19. The apparatus of claim 18, wherein the first payload pattern includes a first encoding of metadata related to the first payload pattern.

20. The apparatus of claim 19, wherein the second payload pattern includes a second encoding of at least one of a checksum or hash associated with at least a portion of the first payload pattern.

* * * * *